United States Patent
Stimm et al.

(10) Patent No.: US 12,063,440 B2
(45) Date of Patent: *Aug. 13, 2024

(54) SYSTEMS AND METHODS FOR STABILIZING VIDEOS

(71) Applicant: GoPro, Inc., San Mateo, CA (US)

(72) Inventors: Daryl Stimm, Encinitas, CA (US); Kyler William Schwartz, Oceanside, CA (US); Kevin Marcus Grant, Phoenix, AZ (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/352,932

(22) Filed: Jul. 14, 2023

(65) Prior Publication Data
US 2023/0362487 A1 Nov. 9, 2023

Related U.S. Application Data

(63) Continuation of application No. 17/830,942, filed on Jun. 2, 2022, now Pat. No. 11,706,527.

(60) Provisional application No. 63/328,181, filed on Apr. 6, 2022.

(51) Int. Cl.
*H04N 23/68* (2023.01)
*H04N 5/14* (2006.01)

(52) U.S. Cl.
CPC .......... *H04N 23/683* (2023.01); *H04N 5/145* (2013.01)

(58) Field of Classification Search
CPC ... H04N 23/683; H04N 5/145; H04N 23/6812
See application file for complete search history.

(56) References Cited

U.S. PATENT DOCUMENTS

| | | | |
|---|---|---|---|
| 9,927,368 B1 | 3/2018 | Olsson | |
| 10,917,573 B1 | 2/2021 | Stimm | |
| 11,706,527 B1 * | 7/2023 | Stimm | H04N 5/145 348/208.6 |
| 2011/0149094 A1 | 6/2011 | Chen | |
| 2013/0182134 A1 | 7/2013 | Grundmann | |
| 2015/0350548 A1 | 12/2015 | Beysserie | |
| 2016/0219223 A1 | 7/2016 | Eline | |
| 2017/0289454 A1 | 10/2017 | Pettersson | |

* cited by examiner

*Primary Examiner* — Twyler L Haskins
*Assistant Examiner* — Angel L Garces-Rivera
(74) *Attorney, Agent, or Firm* — ESPLIN & ASSOCIATES, PC (57) ABSTRACT

Positions of an image capture device during capture of a video may be transferred to a computing device before the video is transferred to the computing device. The positions of the image capture device may be used to determine a viewing window for the video before the video is obtained. The viewing window may be used to present a stabilized view of the video when the video is obtained. For example, a stabilized view of the video may be presented as the video is streamed to the computing device.

20 Claims, 5 Drawing Sheets

SYSTEMS AND METHODS FOR STABILIZING VIDEOS

FIELD

This disclosure relates to determining placement of a viewing window to stabilize a video before the video is obtained.

BACKGROUND

An image capture device may be used to capture a video. A user may need to download the video from the image capture device to a computing device to view the video (e.g., stabilized video). Downloading the video from the image capture device to the computing device, and stabilizing the video after the video has been downloaded, may be inconvenient and/or time consuming.

SUMMARY

This disclosure relates to stabilizing videos. Position information and/or other information may be obtained. The position information may characterize positions of an image capture device during capture of a video having a progress length. The video may include visual content having a field of view. A viewing window for the visual content may be determined as a function of progress through the progress length based on the position information and/or other information. The viewing window may define extents of the visual content to be included within a punchout of the visual content. The viewing window for the visual content may be determined before video information defining the video is obtained. The video information defining the video and/or other information may be obtained. Stabilized visual content may be generated based on the viewing window and/or other information. The stabilized visual content may include the punchout of the extents of the visual content defined by the viewing window.

A system for stabilizing videos may include one or more electronic storage, processor, and/or other components. The electronic storage may store position information, information relating to positions of an image capture device, video information, information relating to a video, information relating to visual content, information relating to a field of view of the visual content, information relating to a viewing window, information relating to a punchout of the visual content, information relating to stabilized visual content, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a position component, a viewing window component, a video component, a stabilization component, and/or other computer program components.

The position component may be configured to obtain position information and/or other information. The position information may characterize positions of an image capture device during capture of a video having a progress length. The video may include visual content having a field of view.

The viewing window component may be configured to determine a viewing window for the visual content as a function of progress through the progress length. The viewing window may be determined based on the position information and/or other information. The viewing window may define extents of the visual content to be included within a punchout of the visual content. The viewing window for the visual content may be determined before video information defining the video is obtained.

In some implementations, determination of the viewing window may include determination of placement of the viewing window within the field of view of the visual content. In some implementations, the placement of the viewing window within the field of view of the visual content may be defined by position and/or rotation of the viewing window. In some implementations, the placement of the viewing window within the field of view of the visual content may be further defined by size and/or shape of the viewing window.

In some implementations, determination of the viewing window before the video information is obtained may include the viewing window for entire progress length of the video being determined before the video information is obtained. In some implementations, determination of the viewing window before the video information is obtained may include the viewing window for a portion of the progress length of the video being determined before the video information for the portion of the progress length of the video is obtained.

The video component may be configured to obtain the video information defining the video. The video information may be obtained after the viewing window for the visual content of the video is determined. In some implementations, the video information defining the video may be obtained based on the viewing window and/or other information. The video information that is obtained may define the extents of the visual content defined by the viewing window. In some implementations, the video information may be obtained from the image capture device.

The stabilization component may be configured to generate stabilized visual content based on the viewing window and/or other information. The stabilized visual content may include the punchout of the extents of the visual content defined by the viewing window. In some implementations, the stabilized visual content may be presented as a preview of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
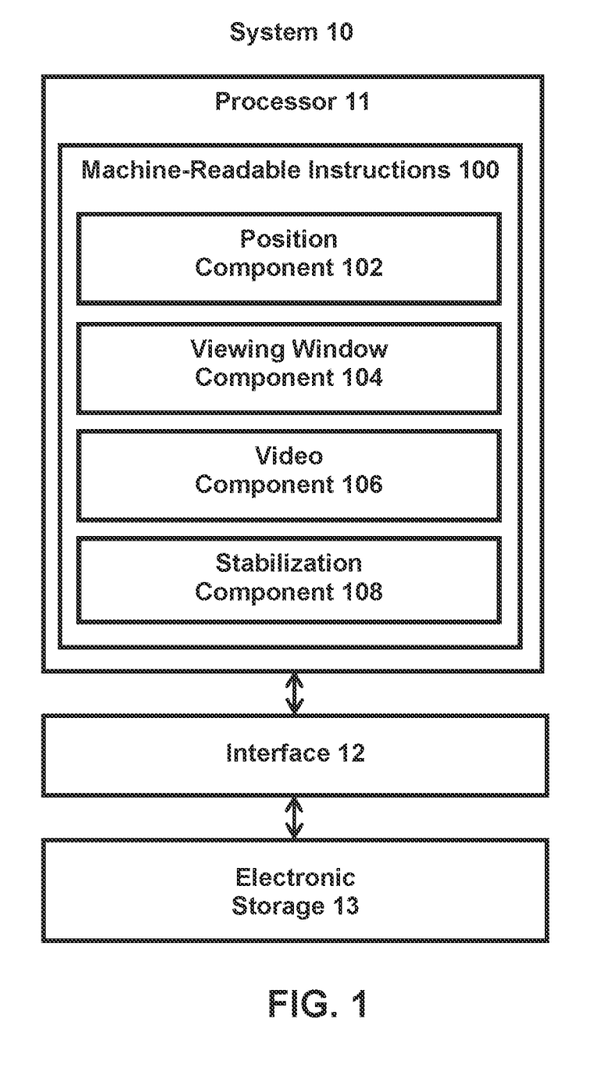
FIG. 1 illustrates an example system for stabilizing videos.

FIG. 1 illustrates a system 10 for stabilizing videos. The system 10 may include one or more of a processor 11, an interface 12 (e.g., bus, wireless interface), an electronic storage 13, and/or other components. Position information and/or other information may be obtained by the processor 11. The position information may characterize positions of an image capture device during capture of a video having a progress length. The video may include visual content having a field of view. A viewing window for the visual content may be determined by the processor 11 as a function of progress through the progress length based on the position information and/or other information. The viewing window may define extents of the visual content to be included within a punchout of the visual content. The viewing window for the visual content may be determined before video information defining the video is obtained. The video information defining the video and/or other information may be obtained by the processor 11. Stabilized visual content may be generated by the processor 11 based on the viewing window and/or other information. The stabilized visual content may include the punchout of the extents of the visual content defined by the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store position information, information relating to positions of an image capture device, video information, information relating to a video, information relating to visual content, information relating to a field of view of the visual content, information relating to a viewing window, information relating to a punchout of the visual content, information relating to stabilized visual content, and/or other information.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Visual content (e.g., of image(s), video frame(s)) may be captured by an image capture device. The image capture device may include a housing. The housing may refer a device (e.g., casing, shell) that covers, protects, and/or supports one or more components of the image capture device. The housing may include a single-piece housing or a multi-piece housing. The housing may carry (be attached to, support, hold, and/or otherwise carry) one or more of an optical element, an image sensor, a processor, a position sensor, and/or other components. The housing may carry other components, such as a sound sensor. Other configurations of image capture devices are contemplated.

An optical element may have a field of view. An optical element may be configured to guide light within a field of view to an image sensor. The image sensor may be configured to generate a visual output signal based on light that becomes incident thereon during a capture duration and/or other information. The visual output signal may convey visual information that defines visual content having the field of view.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor may include conversion of light received by the image sensor into output signals/visual information defining visual content. Capturing visual content may include recording, storing, and/or otherwise capturing the visual content for use in generating video content (e.g., content of video frames). For example, during a capture duration, the visual output signal generated by the image sensor and/or the visual information conveyed by the visual output signal may be used to record, store, and/or otherwise capture the visual content for use in generating video content.

The image capture device may capture other content, such as audio content. Audio content may refer to media content that may be consumed as one or more sounds. Audio content may include one or more sounds stored in one or more formats/containers, and/or other audio content. Audio content may include one or more sounds captured by sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. The audio content may be captured by sound sensors of the image capture device (e.g., microphones of and/or coupled to the image capture device).

The position sensor may include sensor(s) that measures experienced positions and/or motions. The position sensor may convert experienced positions and/or motions into output signals. The output signals may include electrical signals. For example, the position sensor may refer to a set of position sensors, which may include one or more inertial measurement units, one or more accelerometers, one or more gyroscopes, one or more magnetometers, and/or other position sensors. The position sensor may generate output signals conveying information that characterizes positions and/or motions of the position sensor and/or device(s) carrying the position sensor, such as the image capture device and/or the housing of the image capture device.

For example, the position sensor may be configured to generate a position output signal based on positions of the image capture device during the capture duration. The position output signal may convey position information that characterizes positions of the image capture device at different moments (points in time, time durations) within the capture duration. The position information may characterize positions of the image capture device based on specific translational and/or rotational positions of the image capture device and/or based on changes in translational and/or rotational positions of the image capture device as a function of progress through the capture duration. That is, the position information may characterize translational and/or rotational positions of the image capture device and/or changes in translational and/or rotational positions (motion) of the image capture device (e.g., direction, amount, velocity, acceleration) during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The image capture device may a video during a capture duration. Content of a video may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

A user may wish to transfer the video from the image capture device to a different computing device (e.g., desktop device, such as a computer, or a mobile device, such as a smartphone or a tablet). The video may be transferred to enable the user to view the video using the other computing device. For example, the image capture device may not have a display or the display of the image capture device may be small, and any view of the video captured by the image capture device may be small. Additionally, operating the display of the image capture device may consume battery power of the image capture device, which may reduce the amount of battery power available to capture videos.

The size of the video file may be large, and completing transfer of the video to a different computing device may take al long time. Additionally, after the video has been transferred, additional time may be required to perform stabilization of the video.

The present disclosure enables streaming of high-resolution video from the image capture device to a different computing device (e.g., desktop device, such as a computer, or a mobile device, such as a smartphone or a tablet). High-resolution video streaming from the image capture device may enable the users to view the captured video quickly. The present disclosure enables the streamed video to be stabilized for presentation by the computing device.

Figure 3:
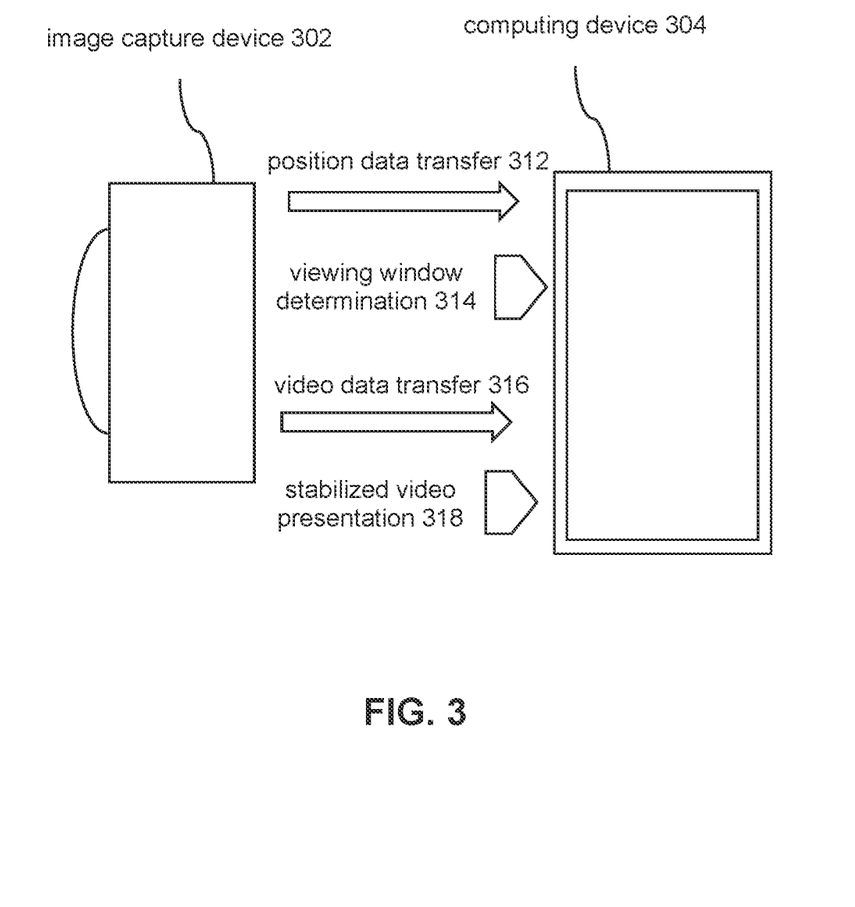
FIG. 3 illustrates an example streaming of a video from an image capture device to a computing device.

FIG. 3 illustrates an example streaming of a video from an image capture device 302 to a computing device 304. The video may include visual content having a field of view. The streaming may begin with position data transfer 312. The position data transfer 312 may include transfer of position information for the video from the image capture device 302 to the computing device 304. The position information may characterize positions of the image capture device 302 during capture of the video. The computing device 304 may perform viewing window determination 314. The viewing window determination 314 may include placement of a viewing window within the field of view of the visual content based on the position information (positions of the image capture device 302 during capture of the video). The viewing window may define extents of the visual content to be included within a punchout of the visual content. Thus, the computing device 304 may determine placement of the viewing window before the video is transferred to the computing device 304. Determining the placement of the viewing window before transfer of the video may enable the video to be stabilized as it is transferred to the computing device 304. For example, rather than completely downloading the video and then applying the stabilization, parts of the video may be stabilized as the parts are transferred to the computing device 304.

Video data transfer 316 may follow the viewing window determination 314. The video data transfer 316 may include transfer of video information defining the video from the image capture device 302 to the computing device 304. The computing device 304 may use the viewing window placement and the video to provide stabilized video presentation 318. The stabilized video presentation 318 may include presentation of the punchout of the extents of the visual content defined by the viewing window. In some implementations, the stabilized video presentation 318 may be provided as a preview of the visual content within the video.

In some implementations, the computing device 304 may provide the stabilized video presentation 318 by obtaining entire field of view of the visual content, and then using the viewing window placement within the field of view of the visual content to determine which spatial parts of the visual content should be presented. Inclusion of the extents of the visual content within the viewing window in the stabilized visual content may effectuate stabilization of the visual content via selective cropping. Stabilization of the visual content may be performed by the computing device 304 as the visual content is obtained by the computing device 304. For example, as video frames are received by the computing device 304, the computing device may provide a stabilized view of the video frames by presenting the parts of the video frames within the viewing window. Determining the placement of the viewing window before obtaining the video frames may enable the computing device 304 to provide the stabilized view of the video frames more quickly. Determining the placement of the viewing window before obtaining the video frames may enable the computing device 304 to provide the stabilized view of the video frames as the video frames are received.

In some implementations, the computing device 304 may provide the stabilized video presentation 318 by obtaining less than the entire field of view of the visual content. For example, the computing device 304 may use the viewing window placement within the field of view of the visual content to request, from the image capture device 302, transfer of the spatial parts of the visual content within the viewing window. That is, rather than obtaining the entire field of view of the visual content, the extents within the viewing window may be obtained by the computing device 304. Thus, the visual content may be stabilized based on extractions of different spatial portions from the visual content for transfer from the image capture device 302 to the computing device 304. Such stabilization of the visual content may reduce the amount of data transfer between the image capture device 302 and the computing device 304.

In some implementations, data transfer between an image capture device and a computing device may be performed over a physical data connection between the image capture device and the computing device. The physical data connection, as opposed to a wireless data connection, may refer to data connection established through one or more physical cables.

Figure 4:
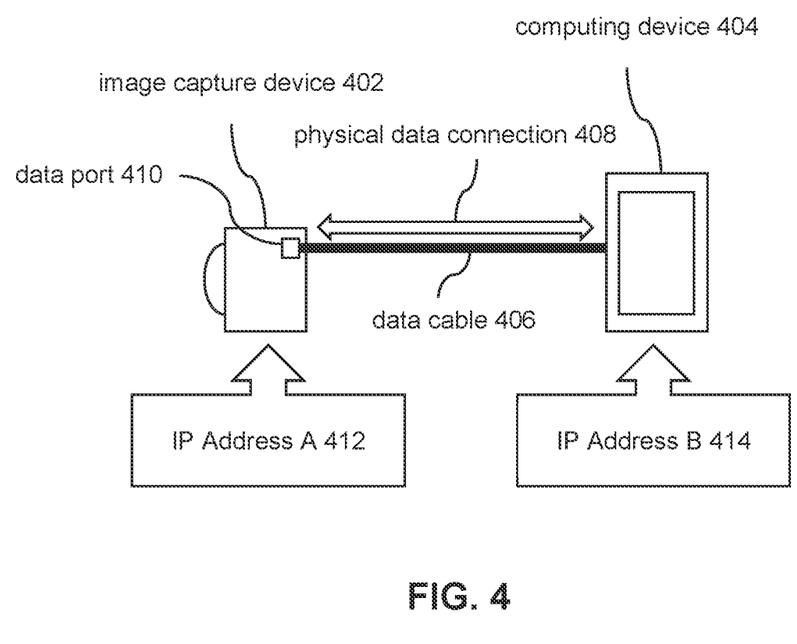
FIG. 4 illustrates an example physical data connection between an image capture device and a computing device.

FIG. 4 illustrates an example physical data connection 408 between an image capture device 402 and a computing device 404. The image capture device 402 may include a data port 410. The data port 410 may refer to a port that serves as an interface between the image capture device 402 and other devices, such as the computing device 404. The data port 410 may include a port that serves as an interface between the image capture device 402 and other devices to enable transfer of information between the image capture device 402 and other devices. The data port 410 may include one or more different types of ports to provide cable connection interfaces, such as a USB port (e.g., USB-A, USB-B, USB-C), a lightning port, and/or other types of ports.

The data port 410 may be configured to connect to a data cable and/or other cables. A data cable may refer to a physical media that allows transfer/transmission of information between different computing devices connected by the data cable. For example, in FIG. 4, a data cable 406 may be configured to be connected to the image capture device 402 via the data port 410. The data cable 406 may be configured to be connected to a computing device (e.g., via one or more data ports of the computing device) to establish a physical data connection (rather than a wireless data connection) between the image capture device 402 and the computing device 404. The data cable 406 may provide the physical data connection between the image capture device 402 and the computing device 404.

In some implementations, the data port 410 may enable transfer of power between the image capture device 402 and the computing device 404. For example, the image capture device 402 may receive power from the computing device 404 over the data cable 406. For instance, when the image capture device 402 is physically connected to the computing device via the data port 410 to send and/or receive information, the image capture device 402 may also receive power from the computing device 404. Such reception of power from the computing device 404 may enable the image capture device 402 to offload content to the computing device 404 without losing power/battery charge.

In some implementations, the image capture device 402 may communicate with the computing device 404 over the physical data connection 408 using a wireless communication protocol. The image capture device 402 may be masqueraded as an ethernet card to the computing device 404 over the physical data connection 408. The image capture device 402 may be associated with an IP address A 412, and the computing device 404 may be associated with an IP address B 414. The image capture device 402 may communicate with the computing device 404 using a wireless communication protocol over the physical data connection 408 based on the IP address A 412 of the image capture device 402 and the IP address B 404 of the computing device 404, and/or other information.

Use of the wireless communication protocol over the physical data connection 408 may enable the image capture device 402 and the computing device 404 to communicate through the data cable 406 as if they were connected wirelessly (e.g., through WiFi). Use of the wireless communication protocol over the physical data connection 408 may enable the image capture device 402 and the computing device 404 to communicate through the data cable 406 without having to go through wireless connection process (e.g., image capture device 402 setting up network and broadcast SSID, the computing device 404 connecting to the network, the image capture device 402 authenticating the access credential of the computing device 404 to join the network).

Such use of physical data connection 408 between the image capture device 402 and the computing device 404 may provide benefit over use of wireless data connection between the image capture device 402 and the computing device 404 to transfer information. For example, using wireless data connection for communication between the image capture device 402 and the computing device 404 may require the image capture device 402 to turn on and use wireless communication components (turn on WiFi or Bluetooth chips on the image capture device 402, which may cause a drain on the battery of the image capture device 402. Using the physical data connection 408, on the other hand, may not require such drain on battery and may be used to supply power to the battery (recharge the battery).

Using wireless data connection for communication between the image capture device 402 and the computing device 404 may require the image capture device 402 and the computing device 404 to perform wireless network setup and wireless network authentication procedure to enable communication between the devices. Using the physical data connection 408, on the other hand, may not require setup of wireless network and wireless network authentication procedure.

Using wireless data connection for communication between the image capture device 402 and the computing device 404 may restrict the image capture device 402 and/or the computing device 404 from being connected to other networks. For instance, to connect to the image capture device 402 wirelessly, the computing device 404 may need to stop its wireless connection to the Internet. Using the physical data connection 408, on the other hand, may enable the image capture device 402 and/or the computing device 404 to be connected to other devices and/or to the Internet (e.g., using wireless connection, using other wired connection).

Additionally, wireless connection (e.g., WiFi connection, Bluetooth connection) between the image capture device 402 and the computing device 404 may have less bandwidth (resulting in slower information transfer speed) and/or less stability (resulting in dropped communication) than the physical data connection 408. Using the physical data connection 408, on the other hand, may enable the image capture device 402 and/or the computing device 404 to communicate at higher rate/using higher bandwidth, and with greater stability in connection. Using the physical data connection 408 may enable the image capture device 402 to transfer high-resolution video to the computing device 404, rather than having to compress the video and transferring low-resolution video to save bandwidth.

Using a wireless communication protocol over the physical data connection 408 between the image capture device 402 and the computing device 404 may provide benefit over using other communication protocol for physical data connections. Using a wireless communication protocol over the physical data connection 408 may enable more capabilities than using other communication protocol for physical data connections. For example, the wireless communication protocol may enable more capabilities in types of information that may be exchanged and/or how the information is exchanged than other communication protocol for physical data connections, such as the Media Transfer Protocol.

For example, the Media Transfer Protocol may restrict transformation of information between the image capture device 402 and the computing device 404 to viewing the list of media stored at the image capture device 402 from the computing device 404 or downloading media stored at the image capture device 402 to the computing device 404. The wireless communication protocol may enable, in addition to enabling viewing list of media stored at the image capture device 402 from the computing device 404 and/or downloading media stored at the image capture device 402 to the computing device 404, previewing and/or editing of media (e.g., visual content, audio content) stored at the image capture device 402 from the computing device 404.

As another example, using custom/proprietary communication protocol for physical data connections, may require specific software and/or hardware (e.g., MFI chip) to enable the communication. Using custom/proprietary communication protocol for physical data connections may require communication framework to be developed to use the custom/proprietary communication protocol to enable different types of information transfer between the image capture device 402 and the computing device 404. Using a wireless communication protocol over the physical data connection 408 may enable the image capture device 402 and the computing device 404 to utilize existing software solution that has been built for wireless communication, such as web-browser technology built for WiFi. Using a wireless communication protocol over the physical data connection 408 may enable the image capture device 402 to communicate with variety of different computing devices (e.g., computing devices running different operating systems, such as Windows, MacOS, Android, Linux).

For example, the image capture device 402 and the computing device 404 may communicate with each other over the physical data connection 408 using WiFi protocol. Using WiFi protocol over the physical data connection 408 may enable the image capture device 402 and the computing device 404 to communicate using technology built for WiFi communication, while not being restricted by technical limitations of WiFi, such as limited bandwidth and/or unstable connection. Using WiFi protocol over the physical data connection 408 may enable the image capture device 402 to receive power from the computing device 404, and allow the image capture device 402 to exchange information with the computing device 404 without losing power and/or while recharging its battery. Use of other wireless communication protocols are completed.

In some implementations, availability of the communication between the image capture device 402 and the computing device 404 using the wireless communication protocol over the physical data connection 408 may be checked using Bluetooth communication and/or other communication. For example, the image capture device 402 and the computing device 404 may communicate using Bluetooth communication to determine whether the image capture device 402 and the computing device 404 are capable of communicating over the physical data connection 408 using the wireless communication protocol. Based on the image capture device 402 and the computing device 404 being capable of communicating over the physical data connection 408 using the wireless communication protocol, the communication over the physical data connection 408 using the wireless communication protocol may be enabled/started when the data cable 406 is connected between the image capture device 402 and the computing device 404. Based on the image capture device 402 and the computing device 404 being incapable of communicating over the physical data connection 408 using the wireless communication protocol, the communication over the physical data connection 408 using another protocol (e.g., Media Transfer Protocol) may be enabled/started when the data cable 406 is connected between the image capture device 402 and the computing device 404.

In some implementations, the image capture device 402 may increase the priority of communication through the physical data connection 408. For example, when the data cable 406 is connected between the image capture device 402 and the computing device 404, resources of the image capture device 402 devoted to the transfer of information through the physical data connection 408 may be increased.

In some implementations, one or more additional communication protocols and/or one or more alternative communication protocols may be used to for communication between the image capture device 402 and the computing device 404 over the physical data connection 408. An additional communication protocol may refer to a communication protocol that is used in addition to the wireless communication protocol to facilitate communication between the image capture device 402 and the computing device 404 over the physical data connection 408. For example, the additional communication protocol may include media transfer protocol, and the image capture device 402 and the computing device 404 may communicate over the physical data connection 408 using the wireless communication protocol and the media transfer protocol. An alternative communication may refer to a communication protocol that is used in place of the wireless communication protocol to facilitate communication between the image capture device 402 and the computing device 404 over the physical data connection 408. For example, the alternative communication protocol may include media transfer protocol, and the image capture device 402 and the computing device 404 may communicate over the physical data connection 408 using the media transfer protocol, rather than using the wireless communication protocol. For instance, the image capture device 402 and the computing device 404 may switch between the wireless communication protocol and the media transfer protocol. Other additional communication protocol and alternative communication protocol are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a position component 102, a viewing window component 104, a video component 106, a stabilization component 108, and/or other computer program components.

The position component 102 may be configured to obtain position information and/or other information. Obtaining position information may include one or more of accessing, acquiring, analyzing, determining, examining, identifying, loading, locating, opening, receiving, retrieving, reviewing, selecting, storing, and/or otherwise obtaining the position information. The position component 102 may obtain position information from one or more locations. For example, the position component 102 may obtain position information from a storage location, such as the electronic storage 13, electronic storage of an image capture device, electronic storage of information and/or signals generated by one or more sensors, electronic storage of a device accessible via a network, and/or other locations. The position component 102 may obtain position information from one or more hardware components (e.g., a position sensor, a communication device) and/or one or more software components (e.g., software running on a computing device).

In some implementations, the position component 102 may obtain position information based on user interaction with a user interface/application (e.g., video editing application, video player application), and/or other information. For example, a user interface/application may provide option(s) for a user to stream video from an image capture device. The position information for the video may be obtained based on the user's selection of the video through the user interface/video application. Other selections of a video for retrieval of position information are contemplated.

In some implementations, the position component 102 may obtain position information for a video while the video is being captured by the image capture device. The position component 102 may obtain position information for the video during generation of the position output signal by the position sensor. The position component 102 may obtain position information for the video after the video/position information has been captured and stored in memory (e.g., the electronic storage 13, electronic storage of an image capture device).

The position information may characterize positions of an image capture device during capture of a video having a progress length. The video may include visual content having a field of view. The position information may characterize positions of the image capture device as a function of progress through the capture duration for the video. Different moments within the capture duration of the video content may correspond to different moments within the progress length of the video. The position information may describe and/or define the positions of the image capture device at different moments within the capture duration and/or changes in positions (motion) of the image capture device at different moments within the capture duration. For example, the position information may characterize and/or be used to determine the rotation of the image capture device that captured the video. In some implementations, the position information may include the direction of gravity on the image capture device at different moments within the capture duration, information on the amount of angle by which the image capture device is tilted with respect to horizon, and/or other information that characterizes and/or may be used to determine the tilt of the image capture device.

Figure 5A:
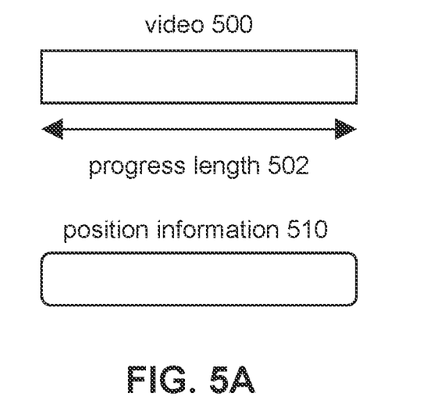
FIG. 5A illustrates an example transfer of position information for a video.

Position information for a portion of the progress length of the video may be obtained by the position component 102 before that portion of the progress length of the video is obtained. For example, the position information for the entire progress length of the video may be obtained before any of the video is obtained. FIG. 5A illustrates an example transfer of position information for a video. In FIG. 5A, a video 500 may have a progress length 502. Position information 510 for the entirety of the progress length 502 of the video 500 may be obtained before any of the video 500 is obtained.

Figure 5B:
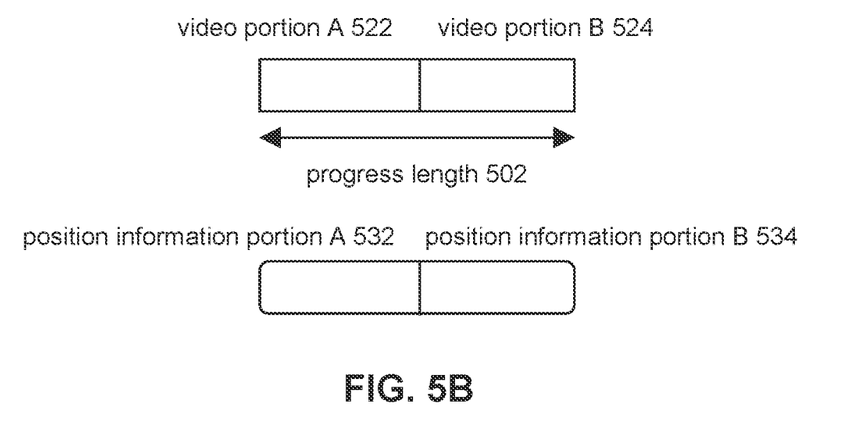
FIG. 5B illustrates an example transfer of position information for a video.

As another example, the position information for a duration of the video may be obtained before that duration of the video is obtained. FIG. 5B illustrates an example transfer of position information for a video. In FIG. 5A, a video may have the progress length 500. The video may have a video portion A 522 and a video portion B 524. The position information portion A 532 for the video portion A 522 may be obtained before the video portion A 522 is obtained. The position information portion B 534 for the video portion B 524 may be obtained before the video portion B 524 is obtained.

The viewing window component 104 may be configured to determine a viewing window for the visual content of the video. Determining a viewing window for the visual content may include ascertaining, establishing, extracting, finding, identifying, obtaining, setting, and/or otherwise determining the viewing window for the visual content. The viewing window may define extents of the visual content to be included within a punchout of the visual content. The viewing window for the visual content may be determined as a function of progress through the progress length of the video. One or more of rotation, location, shape, size, and/or other characteristics of the viewing window may be determined for different moments within the progress length of the visual content.

The viewing window may be determined based on the position information and/or other information. The viewing window may be determined based on the positions of the image capture device during the capture of the video. One or more of rotation, location, shape, size, and/or other characteristics of the viewing window may be determined for different moments within the progress length of the visual content based on the positions of the image capture device during corresponding moments within the capture duration and/or other information. In some implementations, the characteristics of the viewing window for a moment within the progress length of the visual content based on the positions of the image capture device at other moments (e.g., preceding moments and/or subsequent moments) within the capture duration.

The viewing window for the visual content may be determined by the viewing window component 104 before video information defining the video is obtained. In some implementations, determining the viewing window before obtaining the video information may include the viewing window for entire progress length of the video being determined before any of the video information is obtained. That is, the viewing window for the entire progress length of the video may be determined before any of the video is obtained. For example, referring to FIG. 5A, the viewing widow for the entire progress length 502 may be determined based on the position information 510 and/or other information before any of the video 500 is obtained.

In some implementations, determining the viewing window before obtaining the video information may include the viewing window for a portion of the progress length of the video being determined before the video information for the portion of the progress length of the video is obtained. That is, the viewing window for a duration of the video may be determined before the duration of the video is obtained. For example, referring to FIG. 5B, the viewing window for the video portion A 522 may be determined based on the position information portion A 532 and/or other information before the video portion A 522 is obtained. The viewing window for the video portion B 524 may be determined based on the position information portion B 534 and/or other information before the video portion A 522 is obtained.

In some implementations, determining the viewing window may include determining placement of the viewing window within the field of view of the visual content. The placement of the viewing window may refer to how the viewing window is positioned within the field of view of the visual content. In some implementations, the placement of the viewing window within the field of view of the visual content may be defined by position and/or rotation of the viewing window. The position of the viewing window may refer to location (e.g., center location, corner location) of the viewing window within the field of view of the visual content The rotation of the viewing window may refer to how the viewing window is rotated about a point (e.g., center location of the viewing window) within the field of view of the visual content. In some implementations, the placement of the viewing window within the field of view of the visual content may be further defined by size and/or shape of the viewing window. The size of the viewing window may refer to how big the viewing window is within the field of view of the visual content. The size of the viewing window may be measured in terms of pixels, degrees, and/or other quantity. The shape of the viewing window may refer to the external form/contour/outline of the viewing window. The shape of the viewing window may refer to the aspect ratio of the viewing window. Different shape of the viewing window may be used for different types of punchout of the visual content (e.g., rectangular shape, square shape, shape that has straight lines, shape that has curved lines).

The viewing window may be determined based on the position information to provide a stabilized punchout of the visual content. One or more of rotation, location, shape, size, and/or other characteristics of the viewing window may be determined based on the position information to provide a stabilized punchout of the visual content. A stabilized punchout of the visual content may refer to a punchout of the visual content that provides a stabilized view of the visual content. A stabilized punchout of the visual content may refer to a punchout of the visual content in which extents of the visual content are selected for presentation such that the visual content appears stable/more stable. The stabilized view of the visual content may refer to view of the visual content in which the visual content appears stable. The stabilized view of the visual content may refer to view of the visual content in which the visual content appears more stable than the original visual content (e.g., includes less shakes and/or jitters than the original visual content). For example, the image capture device may have been shaken and/or experience vibration during the capture duration. The viewing window may be determined to compensate for the shaking and/or vibration of the image capture device during the capture duration such that the stabilized punchout of the visual content provides a view of the visual content that appears to have been captured by the image capture device without/with shaking and/or vibration.

The viewing window may be determined based on the position information to provide a horizon-leveled punchout of the visual content. One or more of rotation, location, shape, size, and/or other characteristics of the viewing window may be determined based on the position information to provide a horizon-leveled punchout of the visual content. A horizon-leveled punchout of the visual content may refer to a punchout of the visual content that provides a horizon-leveled view of the visual content. A horizon leveled punchout of the visual content may refer to a punchout of the visual content in which extents of the visual content are selected for presentation such that the visual content appears leveled/more leveled with respect to the horizon. The horizon leveled view of the visual content may refer to view of the visual content in which the visual content appears leveled with respect to the horizon. The horizon leveled view of the visual content may refer to view of the visual content in which the visual content appears more leveled with respect to the horizon than the original visual content. For example, the image capture device may have been tilted to the left and/or right during the capture duration. The viewing window may be determined to compensate for the tiling of the image capture device during the capture duration such that the horizon-leveled punchout of the visual content provides a view of the visual content that appears to have been captured by the image capture device without/with less tilting.

The viewing window may be determined based on the position information to provide a stabilized and horizon-leveled punchout of the visual content. One or more of rotation, location, shape, size, and/or other characteristics of the viewing window may be determined based on the position information to provide a stabilized and horizon-leveled punchout of the visual content. A stabilized and horizon-leveled punchout of the visual content may refer to a punchout of the visual content that provides both stabilized and horizon-leveled view of the visual content The video component 106 may be configured to obtain the video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video component 106 may obtain video information from one or more locations. For example, the video component 106 may obtain video information from a storage location, such as the electronic storage 13, electronic storage of an image capture device, electronic storage of information and/or signals generated by one or more sensors, electronic storage of a device accessible via a network, and/or other locations. The video information component 106 may obtain video information from one or more hardware components (e.g., an image sensor, a communication device) and/or one or more software components (e.g., software running on a computing device). In some implementations, the video information may be obtained from the image capture device that captured the video.

The video information may define the video. The video have a progress length. The video may include visual content having a field of view. The video may include other video content, such as audio content. The video information may define the video by including information that defines one or more content, qualities, attributes, features, and/or other aspects of the video. For example, video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

The video information may be obtained after the viewing window for the visual content of the video is determined.

The video information for the video may be obtained after the viewing window for the entire progress length of the video is determined. The video information for a duration of the video may be obtained after the viewing window for the duration of the video is determined.

In some implementations, the video information defining the video may be obtained based on the viewing window and/or other information. The video information that is obtained may define the extents of the visual content defined by the viewing window. Rather than obtaining the video information for the entire field of view of the visual content, the portions of the field of view within the viewing window may be obtained. Selective spatial extents of the visual content may be obtained using the viewing window.

The stabilization component 108 may be configured to generate stabilized visual content based on the viewing window and/or other information. The stabilized visual content may include a punchout of the extents of the visual content defined by the viewing window. That is, the stabilized visual content may be generated to include a punchout of the extents (spatial portions) of the visual content within the viewing window. The viewing window may be used to provide a punchout of the visual content. A punchout of the visual content may refer to an output of one or more extents of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. Inclusion of the extents of the visual content defined by the viewing window within the stabilized visual content may effectuate stabilization of the visual content. Inclusion of the extents of the visual content defined by the viewing windows in the stabilized visual content may effectuate stabilization of the visual content via selective cropping.

In some implementations, the stabilized visual content may further include horizon-leveled visual content. Horizon-leveled visual content may be generated to provide a view in which the visual content is leveled (e.g., a horizon depicted within the visual content is leveled, visual content is leveled with respect to horizon). The viewing window may be used to perform stabilization of the visual content and horizon-leveling of the visual content. Same or different viewing windows may be used for stabilization and horizon leveling of the visual content. For example, stabilization may be performed before horizon leveling using different viewing windows, or vice versa. As another example, stabilization and horizon-leveling may be performed at the same time using one viewing window.

In some implementations, the stabilized visual content may be generated as images/video frames including extent(s) of the visual content within the viewing window(s). The stabilized visual content may be generated as outputs of portions of the visual content captured by the image capture device, with the outputted portions including extents of the visual content defined by the viewing window.

In some implementations, the stabilized visual content may be generated as an encoded version/copy of the stabilized visual content (e.g., encoded video file) and/or a director track that defines the extents of the visual content to be used during playback to provide a stabilized view of the visual content. For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may define which visual portions of the visual content (images, video frames) should be included within the presentation of the visual content. The instructions may define which visual portions of the visual content should be included during playback to provide a stabilized view of the visual content. The instructions may include information on the location, size, shape, and/or rotation of the punchout of images/video frames to be used to as a function progress through the progress length of the visual content to provide a stabilized view of the images/video frames. A video player may use the instructions to retrieve the relevant visual portions of the images/video frames when the visual content is opened and/or is to be presented.

In some implementations, the stabilized visual content may be presented as a preview of the visual content. The stabilized visual content of the video may be presented as the preview of the visual content while the video/visual content is being streamed from the image capture device. In some implementations, one or more options may be presented to a user to select between presentation of the stabilized visual content and presentation of the original visual content. For example, option(s) to turn on/off stabilization may be presented to a user in a graphical user interface. The stabilized visual content may be presented when the stabilization is turned on while the original visual content may be presented when the stabilization is turned off. The option(s) may enable changes to other generation of the stabilized visual content, such as changing the strength/type of stabilization applied to the visual content or turning on/off horizon leveling.

The stabilization component 108 may be configured effectuate storage of the stabilized visual content and/or other information in one or more storage media. For example, the stabilized visual content (e.g., video file, director track) may be stored in the electronic storage 13, remote storage locations (storage media located at/accessible through a server), and/or other locations. In some implementations, the stabilization component 108 may effectuate storage of the stabilized visual content through one or more intermediary devices. For example, the processor 11 may be located within a computing device without a connection to the storage device (e.g., the computing device lacks WiFi/cellular connection to the storage device). The stabilization component 108 may effectuate storage of the stabilized visual content through another device that has the necessary connection (e.g., the computing device using a WiFi/cellular connection of a paired mobile device, such as a smartphone, tablet, laptop, to store information in one or more storage media). Other storage locations for and storage of the stabilized visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
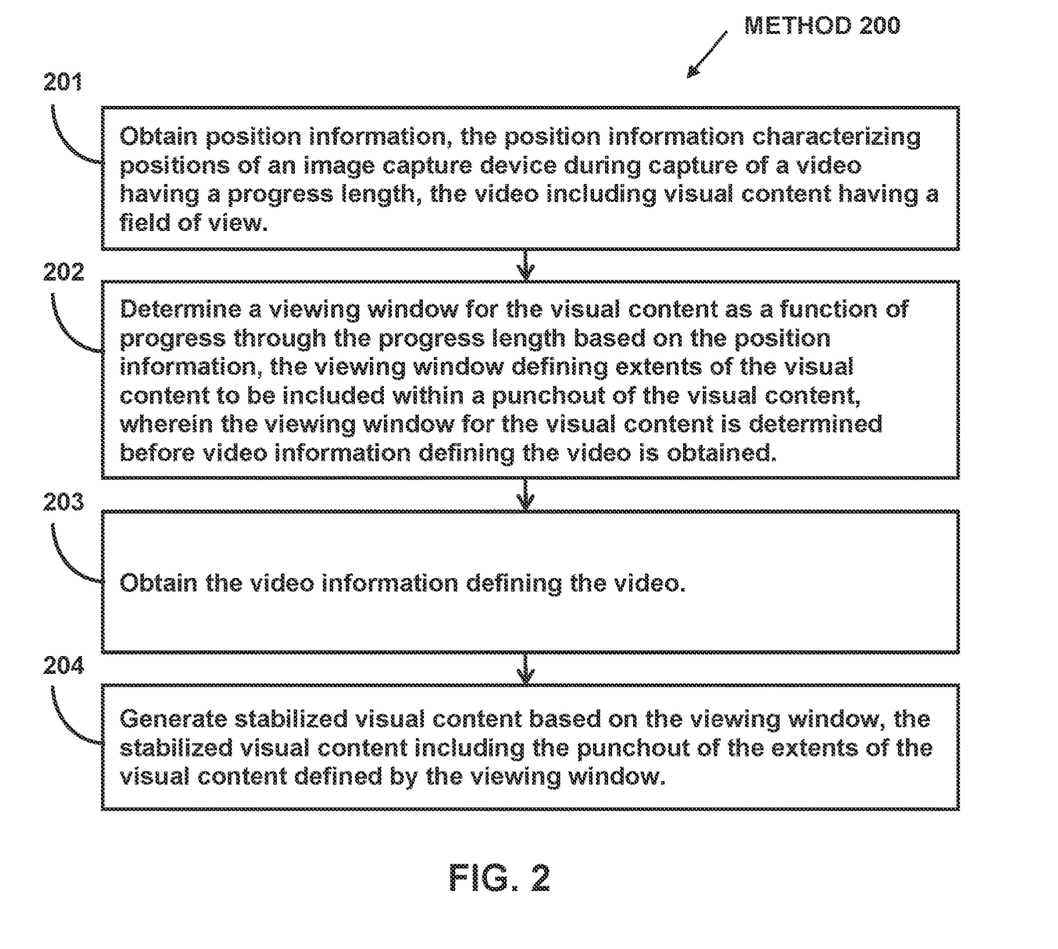
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, position information and/or other information may be obtained. The position information may characterize positions of an image capture device during capture of a video having a progress length. The video may include visual content having a field of view. In some implementations, operation 201 may be performed by a processor component the same as or similar to the position component 102 (Shown in FIG. 1 and described herein).

At operation 202, a viewing window for the visual content may be determined as a function of progress through the progress length based on the position information and/or other information. The viewing window may define extents of the visual content to be included within a punchout of the visual content. The viewing window for the visual content may be determined before video information defining the video is obtained. In some implementations, operation 202 may be performed by a processor component the same as or similar to the viewing window component 104 (Shown in FIG. 1 and described herein).

At operation 203, the video information defining the video and/or other information may be obtained. In some implementations, operation 203 may be performed by a processor component the same as or similar to the video component 106 (Shown in FIG. 1 and described herein).

At operation 204, stabilized visual content may be generated based on the viewing window and/or other information. The stabilized visual content may include the punchout of the extents of the visual content defined by the viewing window. In some implementations, operation 204 may be performed by a processor component the same as or similar to the stabilization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain position information for a portion of a video, the position information for the portion of the video characterizing positions of an image capture device during capture of the portion of the video, the video including visual content having a field of view;
determine placement of a viewing window within the field of view of the visual content of the portion of the video before the portion of the video is obtained, the viewing window determined based on the position information for the portion of the video, the viewing window defining extents of the visual content to be included within a punchout of the visual content;
obtain video information defining the portion of the video from the image capture device; and
generate stabilized visual content of the portion of the video based on the viewing window, the stabilized visual content including the punchout of the extents of the visual content of the portion of the video defined by the viewing window, wherein the stabilized visual content is presented as a preview of the visual content.

2. The system of claim 1, wherein:
the placement of the viewing window within the field of view of the visual content is defined by position and rotation of the viewing window; and
determination of the viewing window for the visual content of the portion of the video before the portion of the video is obtained enables the stabilized visual content of the portion of the video to be presented as the video is streamed from the image capture device.

3. A system for stabilizing videos, the system comprising:
one or more physical processors configured by machine-readable instructions to:
obtain position information for a portion of a video, the position information for the portion of the video characterizing positions of an image capture device during capture of the portion of the video, the video including visual content having a field of view;
determine a viewing window for the visual content of the portion of the video before the portion of the video is obtained, the viewing window determined based on the position information for the portion of the video, the viewing window defining extents of the visual content to be included within a punchout of the visual content;
obtain video information defining the portion of the video; and
generate stabilized visual content of the portion of the video based on the viewing window, the stabilized visual content including the punchout of the extents of the visual content of the portion of the video defined by the viewing window.

4. The system of claim 3, wherein determination of the viewing window includes determination of placement of the viewing window within the field of view of the visual content.

5. The system of claim 4, wherein the placement of the viewing window within the field of view of the visual content is defined by position and rotation of the viewing window.

6. The system of claim 5, wherein the placement of the viewing window within the field of view of the visual content is further defined by size and/or shape of the viewing window.

7. The system of claim 3, wherein:
the position information for entirety of the video is obtained before the video is obtained; and
the viewing window for the entirety of the video is determined before the video is obtained.

8. The system of claim 3, wherein the video information defining the portion of the video is obtained based on the viewing window for the visual content of the portion of the video, the video information that is obtained defining the extents of the visual content defined by the viewing window.

9. The system of claim 3, wherein the video information is obtained from the image capture device.

10. The system of claim 3, wherein determination of the viewing window for the visual content of the portion of the video before the portion of the video is obtained enables the stabilized visual content of the portion of the video to be presented as the video is streamed from the image capture device.

11. The system of claim 3, wherein the stabilized visual content is presented as a preview of the visual content.

12. A method for stabilizing videos, the method performed by a computing system including one or more processors, the method comprising:
obtaining, by the computing system, position information for a portion of a video, the position information for the portion of the video characterizing positions of an image capture device during capture of the portion of the video, the video including visual content having a field of view;
determining, by the computing system, a viewing window for the visual content of the portion of the video before the portion of the video is obtained, the viewing window determined based on the position information for the portion of the video, the viewing window defining extents of the visual content to be included within a punchout of the visual content;

obtaining, by the computing system, video information defining the portion of the video; and generating, by the computing system, stabilized visual content of the portion of the video based on the viewing window, the stabilized visual content including the punchout of the extents of the visual content of the portion of the video defined by the viewing window.

13. The method of claim 12, wherein determining the viewing window includes determining placement of the viewing window within the field of view of the visual content.

14. The method of claim 13, wherein the placement of the viewing window within the field of view of the visual content is defined by position and rotation of the viewing window.

15. The method of claim 14, wherein the placement of the viewing window within the field of view of the visual content is further defined by size and/or shape of the viewing window.

16. The method of claim 12, wherein:
the position information for entirety of the video is obtained before the video is obtained; and
the viewing window for the entirety of the video is determined before the video is obtained.

17. The method of claim 12, wherein the video information defining the portion of the video is obtained based on the viewing window for the visual content of the portion of the video, the video information that is obtained defining the extents of the visual content defined by the viewing window.

18. The method of claim 12, wherein the video information is obtained from the image capture device.

19. The method of claim 12, wherein determining the viewing window for the visual content of the portion of the video before the portion of the video is obtained enables the stabilized visual content of the portion of the video to be presented as the video is streamed from the image capture device.

20. The method of claim 12, wherein the stabilized visual content is presented as a preview of the visual content.

* * * * *